(12) United States Patent
Yakos

(10) Patent No.: US 11,109,707 B2
(45) Date of Patent: Sep. 7, 2021

(54) PORTABLE BEVERAGE PRESS MUG AND METHODS

(71) Applicant: Streamline Design, LLC, Bozeman, MT (US)

(72) Inventor: David J. Yakos, Bozeman, MT (US)

(73) Assignee: Streamline Design, LLC, Bozeman, MT (US)

( * ) Notice: Subject to any disclaimer, the term of this patent is extended or adjusted under 35 U.S.C. 154(b) by 10 days.

(21) Appl. No.: 16/370,502

(22) Filed: Mar. 29, 2019

(65) Prior Publication Data

US 2019/0223649 A1    Jul. 25, 2019

Related U.S. Application Data

(62) Division of application No. 15/491,604, filed on Apr. 19, 2017, now Pat. No. 10,716,426.

(51) Int. Cl.
| | |
|---|---|
| *A47J 31/00* | (2006.01) |
| *A47J 31/18* | (2006.01) |
| *A47J 31/20* | (2006.01) |
| *A23F 5/26* | (2006.01) |
| *A23F 3/18* | (2006.01) |

(52) U.S. Cl.
CPC ............ *A47J 31/005* (2013.01); *A23F 3/18* (2013.01); *A23F 5/26* (2013.01); *A23F 5/265* (2013.01); *A47J 31/18* (2013.01); *A47J 31/20* (2013.01)

(58) Field of Classification Search
CPC .......... A47J 31/18; A47J 31/20; A47J 31/005; A47J 31/02; A47J 31/06; A47J 31/0605; A47J 31/0621; A47J 31/0626; A47J 31/0631; A47J 31/0636; A47J 31/38; A47J 31/446; A47J 31/46; A47J 31/461; A47J 31/48; A47J 31/4403; A47J 31/4407; A23F 3/18; A23F 5/26; A23F 5/265

See application file for complete search history.

(56) References Cited

U.S. PATENT DOCUMENTS

| | | | | |
|---|---|---|---|---|
| 2,900,896 | A * | 8/1959 | Bondanini | A47G 19/14 99/287 |
| 2,972,406 | A * | 2/1961 | Mayer | B65D 85/816 426/86 |
| 5,632,193 | A * | 5/1997 | Shen | A47J 31/02 99/285 |
| 5,725,765 | A * | 3/1998 | Shen | A47J 31/02 210/238 |
| 5,887,510 | A * | 3/1999 | Porter | A47J 31/20 99/287 |
| 6,422,133 | B1 * | 7/2002 | Brady | A47J 31/20 99/287 |

(Continued)

FOREIGN PATENT DOCUMENTS

| | | |
|---|---|---|
| WO | 2005055787 A1 | 6/2005 |
| WO | 2008147308 A1 | 12/2008 |

*Primary Examiner* — Drew E Becker
*Assistant Examiner* — Bryan Kim
(74) *Attorney, Agent, or Firm* — Merchant & Gould P.C.

(57) ABSTRACT

A portable beverage press mug is includes a vessel and a press head assembly. The press head assembly includes a screen (or filter) and a valve arrangement covering the screen. The valve arrangement is movable in response to fluid pressure to create a gap between the valve arrangement and the frame and permit fluid to pass through the screen and the gap.

14 Claims, 9 Drawing Sheets

(56) References Cited

U.S. PATENT DOCUMENTS

| | | | |
|---|---|---|---|
| 6,692,780 B1* | 2/2004 | Sandin | A47G 19/16 426/112 |
| 6,797,160 B2* | 9/2004 | Huang | A47J 31/20 210/117 |
| 6,797,304 B2* | 9/2004 | McGonagle | A47J 31/20 426/431 |
| 7,213,507 B2* | 5/2007 | Glucksman | A47J 31/20 99/287 |
| 9,192,261 B2* | 11/2015 | Katz | A47J 31/18 |
| 9,232,873 B2* | 1/2016 | Juris | A23F 3/18 |
| 9,492,027 B2 | 11/2016 | Morse | |
| 9,498,081 B2 | 11/2016 | Baccetti | |
| 2005/0199129 A1* | 9/2005 | Glucksman | A47J 31/20 99/279 |
| 2006/0021524 A1* | 2/2006 | Liu | A47J 31/20 100/116 |
| 2007/0101868 A1 | 5/2007 | Porter | |
| 2014/0242240 A1* | 8/2014 | Billadeau | A47J 31/20 426/435 |
| 2015/0196158 A1* | 7/2015 | Velasquez | A47G 19/16 99/297 |

\* cited by examiner

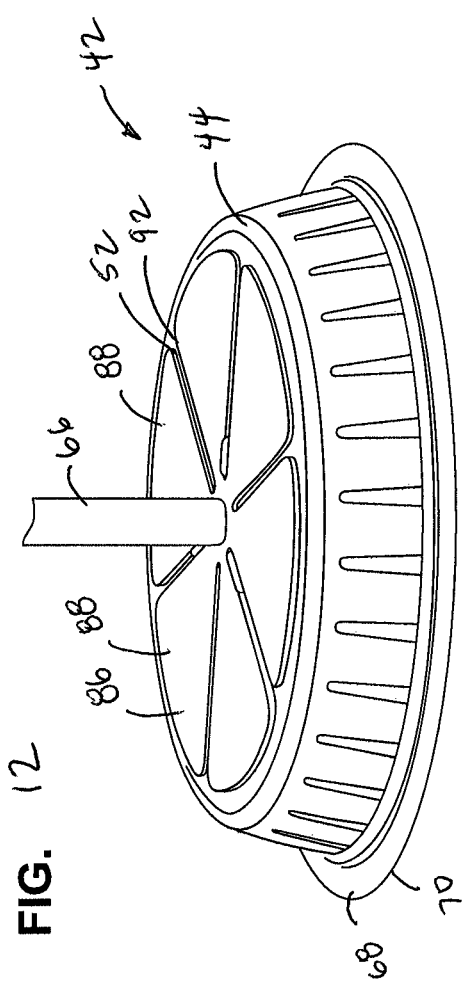

PORTABLE BEVERAGE PRESS MUG AND METHODS

CROSS REFERENCE TO RELATED APPLICATIONS

This application is a divisional of U.S. Ser. No. 15/491,604, filed Apr. 19, 2017, now U.S. Pat. No. 10,716,426 B2 on Jul. 21, 2020, which is incorporated herein by reference. To the extent appropriate, a claim of priority is made to the above disclosed application.

TECHNICAL FIELD

This disclosure relates to a mug for making beverages. In particular, this disclosure relates to a mug for making beverages infused with solid particles and using a press head to trap the solid particles at the bottom of the mug.

BACKGROUND

Portable beverage press mugs, such as a press mug used for making a French press coffee, are known. For example, U.S. Pat. No. 5,887,510 describes a mug for making a beverage, such as coffee, by using French press techniques in a portable mug.

Ways to improve the flavor of coffee and other infused beverages, while maintaining the portability, are always desirable.

SUMMARY

A portable beverage press mug is provided that improves the prior art.

In one aspect, a portable beverage press mug is provided including a vessel and a press head assembly. The vessel has a bottom end, a surrounding wall, an open mouth opposite of the bottom end, and an interior volume defined by the surrounding wall and bottom end. The surrounding wall includes an interior surface surrounding the interior volume. The press head assembly is movable within the interior volume of the vessel between the mouth and the bottom end. The press head assembly includes a frame having a perimeter edge and an open volume within the perimeter edge. A seal member is along the perimeter edge of the frame and is sized to engage against, or wipe, the interior surface of the surrounding wall along at least a portion of the interior surface. A screen covers the open volume of the frame. A valve arrangement covers the screen and is movable in response to fluid pressure to create a gap between the valve arrangement and the frame and permit fluid to pass through the screen and the gap.

In many examples, a rod is connected to the press head assembly. The rod transmits a force onto the press head assembly to move the press head assembly within the interior volume of the vessel.

In example embodiments, the perimeter edge of the frame has a circular cross-sectional shape.

In many arrangements, the frame further includes a central hub and a plurality of spokes extending between the hub and the perimeter edge.

In one or more embodiments, the valve arrangement comprises a flap valve including a plurality of movable sectors.

In example implementations, the valve arrangement comprises a flap valve including a central hub and a plurality of movable sectors connected to the hub, each sector being oriented over a portion of the screen, and each sector being spaced from an adjacent sector by a gap.

In many examples, the gaps in the flap valve are oriented along one of the spokes.

In example implementations, the central hub of the flap valve defines a valve aperture. The hub of the frame defines a frame aperture. The frame aperture and the valve aperture are arranged to be concentric with each other.

In example embodiments, a rod is connected to the press head assembly to transmit a force onto the press head assembly and move the press head assembly within the interior volume of the vessel. The rod will be connected to the press head assembly by being received within the frame aperture and valve aperture.

In one or more embodiments, the frame aperture includes a threaded insert, and the rod is threadably connected to the press head assembly at the threaded insert.

In preferred implementations, a cover or lid is provided removably covering the open mouth of the vessel, and the rod slidably extends through the lid.

In example arrangements, the lid includes a recess, and the rod has a handle. The handle is received within the recess, when the press head assembly is moved toward the bottom end of the vessel.

In example embodiments, the seal member includes a flange extending from the perimeter edge.

In one or more arrangements, the seal member is overmolded onto the frame, and the screen is secured to the frame by overmolding.

Preferably, the surrounding wall is a double wall of stainless steel.

Preferably, the valve arrangement is stainless steel.

In another aspect, a portable beverage press mug is provided having a vessel and a press head assembly. The vessel has a bottom end, a surrounding wall, an open mouth opposite of the bottom end, and an interior volume defined by the surrounding wall and bottom end. The press head assembly is movable within the interior volume of the vessel between the mouth and the bottom end. The press head assembly includes a frame having a perimeter edge and an open volume within the perimeter edge; a seal member along the perimeter edge; a screen covering the open volume of the frame; and a flap valve. The flap valve has a plurality of movable sectors covering the screen and being movable in response to fluid pressure to create a gap between at least one of the valve sectors and the frame to permit fluid to pass through the screen and the gap.

Preferably, the flap valve includes a central hub, and each sector is connected to the central hub and spaced from an adjacent sector by a gap.

In preferred arrangements, a rod is connected to the press head assembly. The rod transmits a force onto the press head assembly to move the press head assembly within the interior of the vessel, and the flap valve is secured to the frame by the rod.

In another aspect, a method of making a beverage is provided. The method includes a step of providing a mixture of solid particles and a liquid into a vessel. Next, there is a step of moving a press head assembly within the vessel toward a bottom of the vessel to trap the solid particles between a screen in the press head assembly and the bottom, while allowing the liquid to flow through a gap between a flap valve and a frame of the press head assembly.

In example methods, the step of moving a press head assembly within the vessel includes moving a press head assembly having a seal member that wipes the interior surface of the vessel, as the press head assembly is moved toward the bottom of the vessel.

In example methods, the step of moving a press head assembly includes trapping the solid particles using the screen, which is covering an open volume of a frame of the press head assembly.

In example methods, the step of moving a press head assembly includes using a flap valve with a plurality of movable sectors covering the screen and movable in response to fluid pressure to create the gap between at least one of the valve sectors and the frame to permit fluid to pass through the screen and the gap.

In example methods, after the step of moving a press head assembly, there is a step of allowing the flap valve to close any gaps and cover the screen to prevent the solid particles from further infusing into the liquid.

In example methods, the step of providing a mixture of solid particles and liquid include providing coffee grains and water into the vessel.

In example methods, after the step of providing a mixture of solid particles and liquid into a vessel, there is a step of waiting for a predetermined or desired infusion period before executing the step of moving the press head assembly.

In example methods, the step of using a press head assembly can include using a press head assembly as variously characterized above.

A variety of examples of desirable product features or methods are set forth in part in the description that follows, and in part, will be apparent from the description, or may be learned by practicing the various aspects of the disclosure. The aspects of the disclosure may relate to individual features as well as combinations of features. It is to be understood that both the forgoing general description and the following detailed description are explanatory only, and are not restrictive of the claimed invention.

BRIEF DESCRIPTION OF THE DRAWINGS

FIG. 12 is a perspective view of the press head assembly of FIGS. 9-11 in an assembled condition.

DETAILED DESCRIPTION

A. Some Problems with Current Beverage Press Mugs

U.S. Pat. No. 5,887,510 describes a portable beverage press mug, which is usable to make a beverage, such as freshly brewed coffee. The coffee grounds are put into the vessel, and then hot water is poured into the vessel. After a few minutes to allow the coffee to be infused into the water, a plunger assembly is pressed, which filters the coffee grains through a filter or screen and pushes them to the bottom of the vessel. The coffee is then drunk from the vessel.

With this arrangement, however, the coffee grounds are still exposed to the water in the vessel, while the coffee is being drunk from the vessel. The coffee grounds are exposed to the water through the filter or screen. This allows the coffee to be "over steeped". The coffee can become bitter from this overexposure between the coffee grounds and the water.

This disclosure relates to a solution to this problem. The solution prevents the coffee from becoming over steeped and bitter tasting by overexposure. The solution results in better tasting coffee. The solution is also usable for other beverages, including tea or cocoa.

B. FIGS. 1-12

Figure 1:
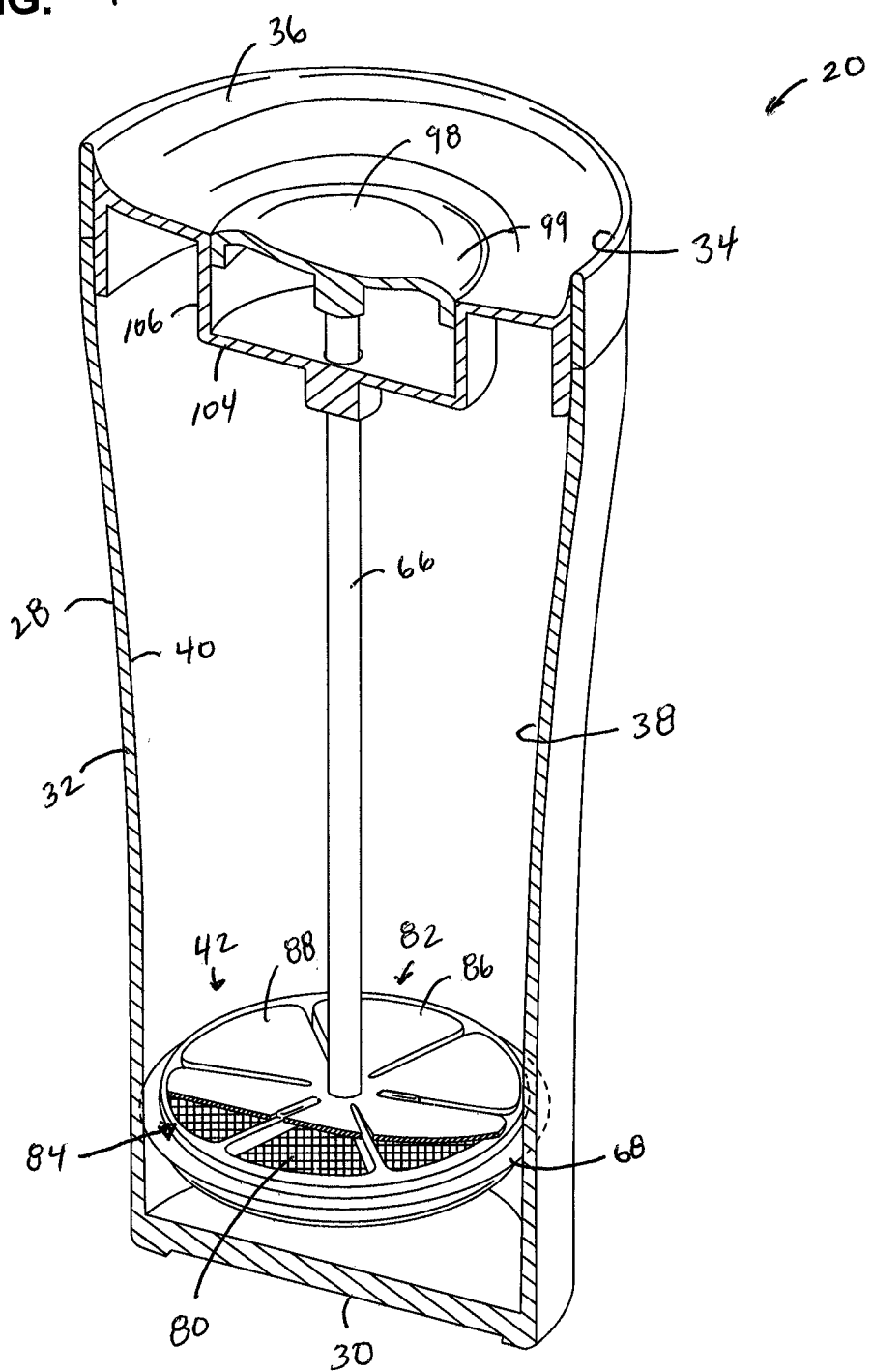
FIG. 1 is a perspective, cross-sectional view of a first embodiment of a portable beverage press mug, constructed in accordance with principles of this disclosure.

A portable beverage press mug constructed in accordance with the principles of this disclosure is shown in FIG. 1 at 20. The mug 20 is portable, in that it is intended for easy transportation and is sized to hold about the amount of liquid that a person normally would have in a mug. For example, the mug can be sized to hold at least 6 ounces, and no more than about 20 ounces of liquid.

Figure 2:
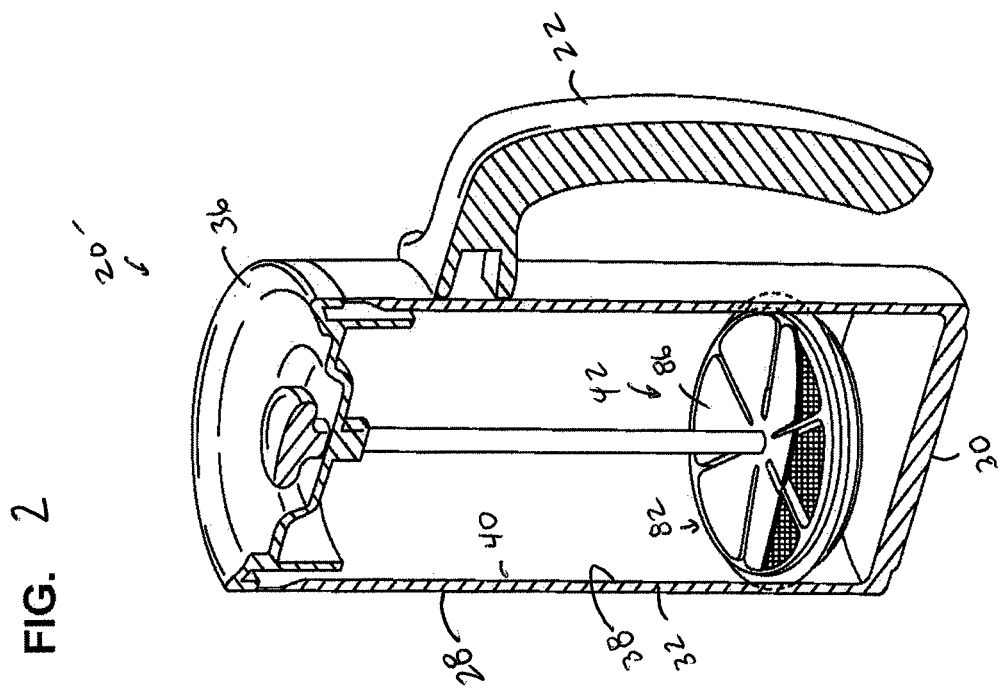
FIG. 2 is a cross-sectional, perspective view of an alternate embodiment, constructed in accordance with principles of this disclosure.

FIG. 2 shows an alternate embodiment of the portable beverage mug at 20'. This embodiment includes a pour handle 22 projecting therefrom.

Figure 3:
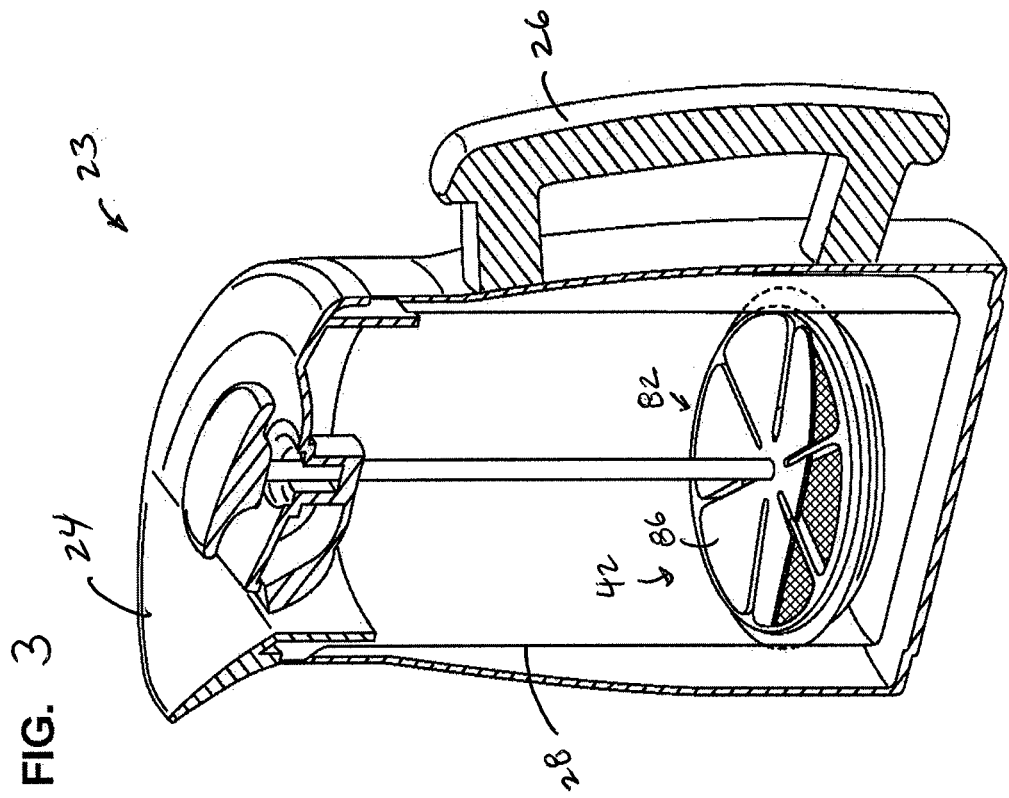
FIG. 3 is a perspective, cross-sectional view of another alternate embodiment, constructed in accordance with principles of this disclosure.

FIG. 3 shows another embodiment in the form of a dispenser or pot 23 including a pour spout 24 and side handle projecting therefrom at 26.

It should be understood that the embodiments of the mug 20' and pot 23 are included herein because they include the same internal components as the mug 20 of FIG. 1. Common parts will use common reference numerals, and a description of the parts in connection with the mug 20 of FIG. 1 apply to the description of the parts of mug 20' (FIG. 2) and pot 23 (FIG. 3).

The mug 20 includes a vessel 28. The vessel 28 has a closed bottom end 30 and a surrounding wall 32 extending from the bottom end 30.

In the embodiment of FIG. 1, the surrounding wall 32 is generally circular in cross-section, although the size of the circular cross-section can vary along the length. Generally, the surrounding wall cross-section will be smallest adjacent the bottom end 30 and largest adjacent an open mouth 34. The surrounding wall 32 can also have a uniform cross-section along the length between the bottom end 30 and open mouth 34. The open mouth 34 is at an opposite end of the vessel 28 from the closed bottom end. In FIG. 1, the open mouth 34 is shown covered by a removable lid 36, described further below. In preferred arrangements, the vessel 28 has a diameter that is sized to be easily held by and grasped by a human hand. For example, the diameter of the vessel 28 can be at least 2.5 inches, no greater than 6 inches, typically 2.75-4 inches.

The surrounding wall 32, in this embodiment, is a double wall of stainless steel. This allows for a better tasting beverage and permits easier cleaning after use. The double wall helps to retain the heat of the beverage.

The vessel 28 includes an interior volume 38. The interior volume 38 is defined by the surrounding wall 32 and the bottom end 30. The surrounding wall 32 has an interior surface 40 that surrounds the interior volume 38.

Figure 4:
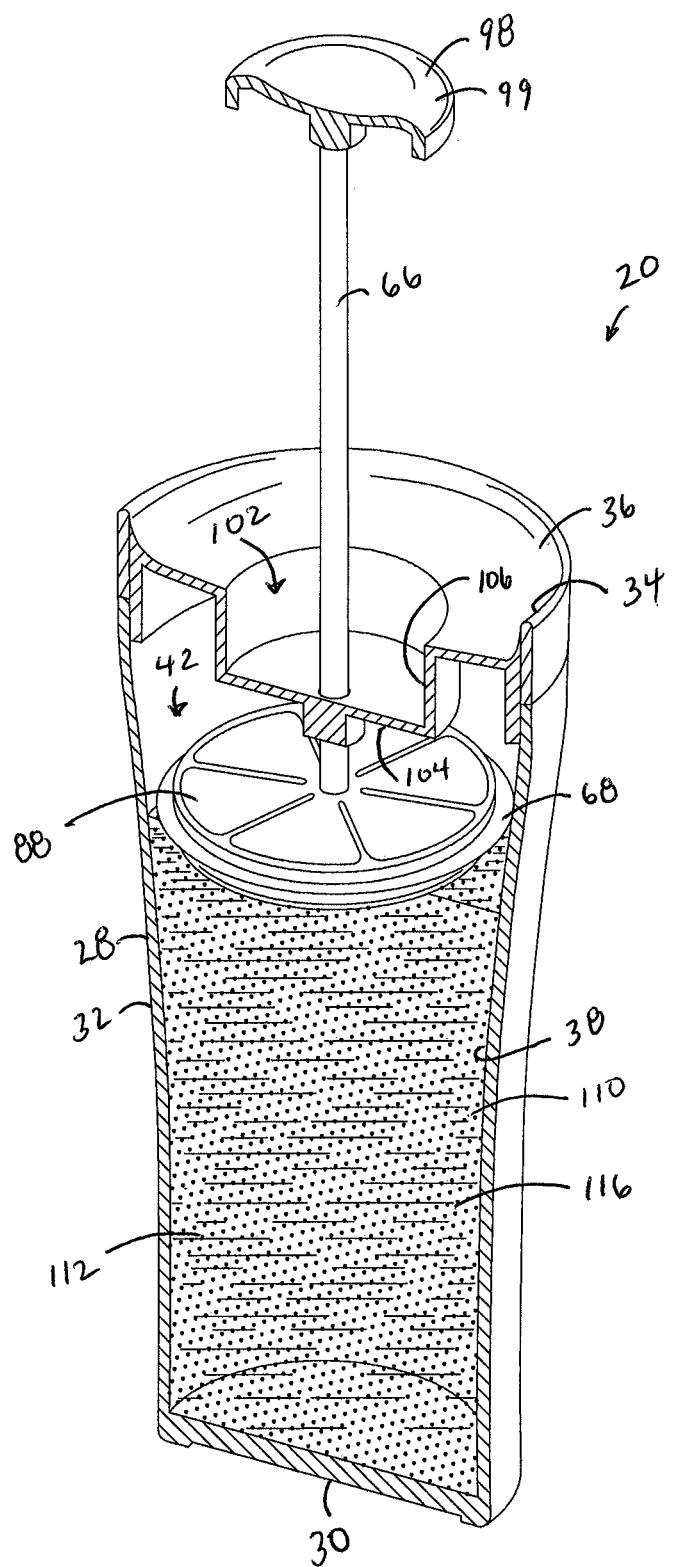
FIGS. 4-6 are perspective, cross-sectional views of the portable beverage press mug of FIG. 1 during steps of use.
Figure 5:
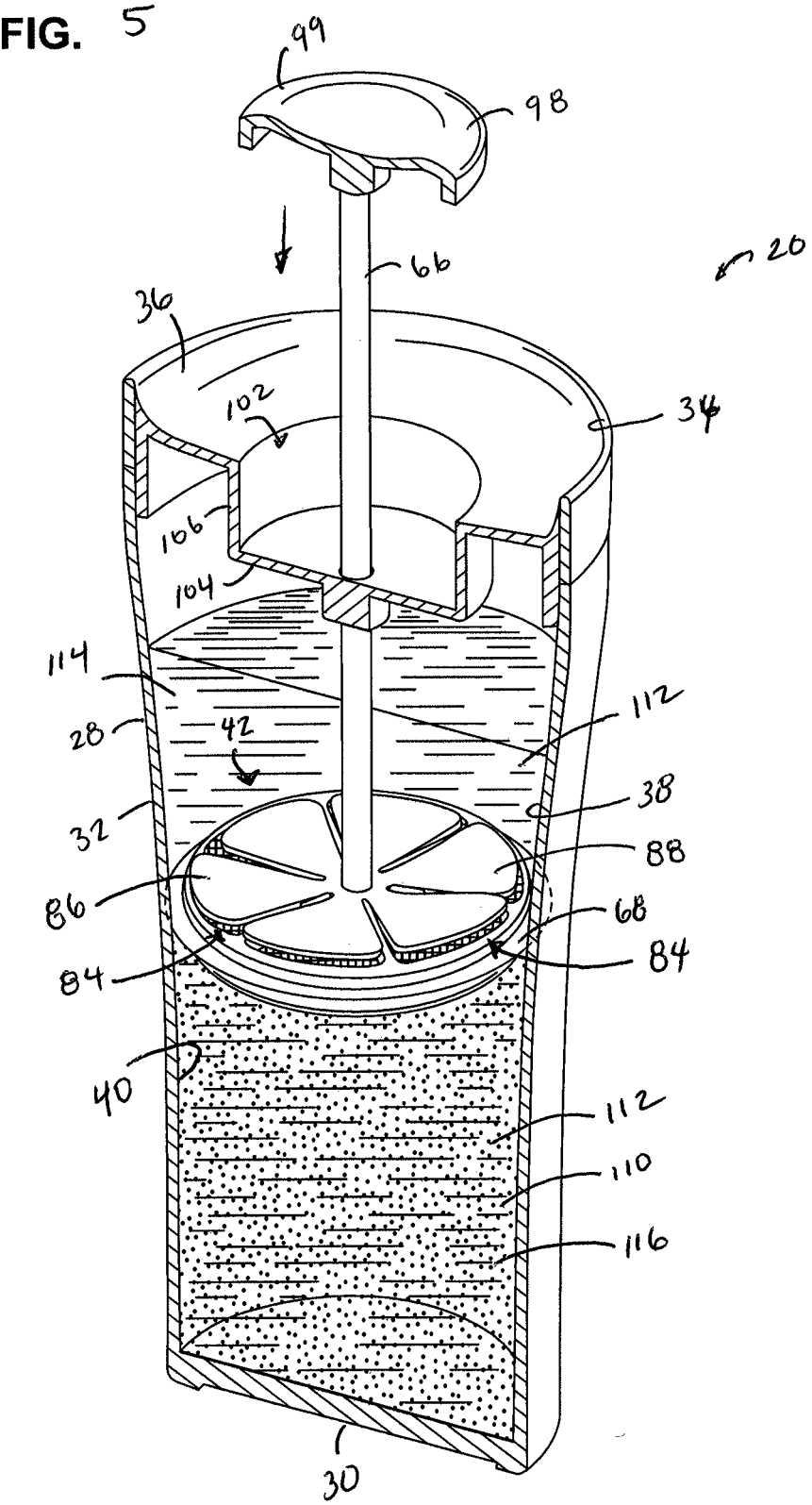
Figure 6:
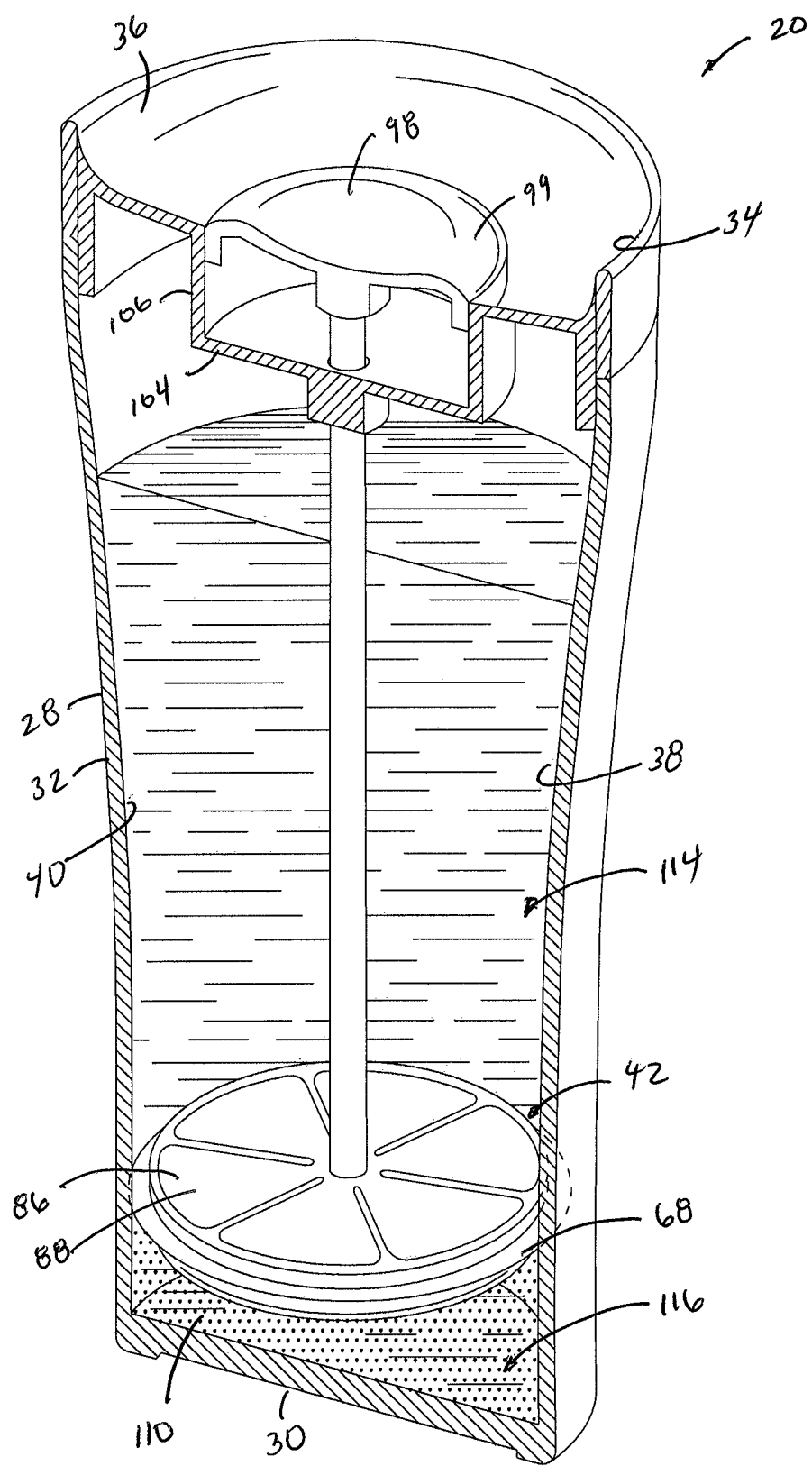

The mug 20 includes a press head assembly 42. Enlarged views of the press head assembly 42 are illustrated in FIGS. 7-12. The press head assembly 42 is movable within the interior volume 38 of the vessel 28 between the mouth 34 and the bottom end 30. FIG. 4 shows the press head assembly 42 adjacent the open mouth 34, while FIG. 6 shows the press head assembly 42 adjacent the closed bottom end 30. FIG. 5 shows the press head assembly 42 intermediate the open mouth 34 and the bottom end 30.

Many embodiments for the press head assembly 42 are possible. In the examples shown, and in reference not to FIGS. 7-12, the press head assembly 42 includes a frame 44. The frame 44 has a perimeter edge 46 and an open volume 48 (FIGS. 9 and 11) within the perimeter edge 46. While many different shapes are possible, in this embodiment, the perimeter edge 46 has a circular cross-sectional shape.

Figure 9:
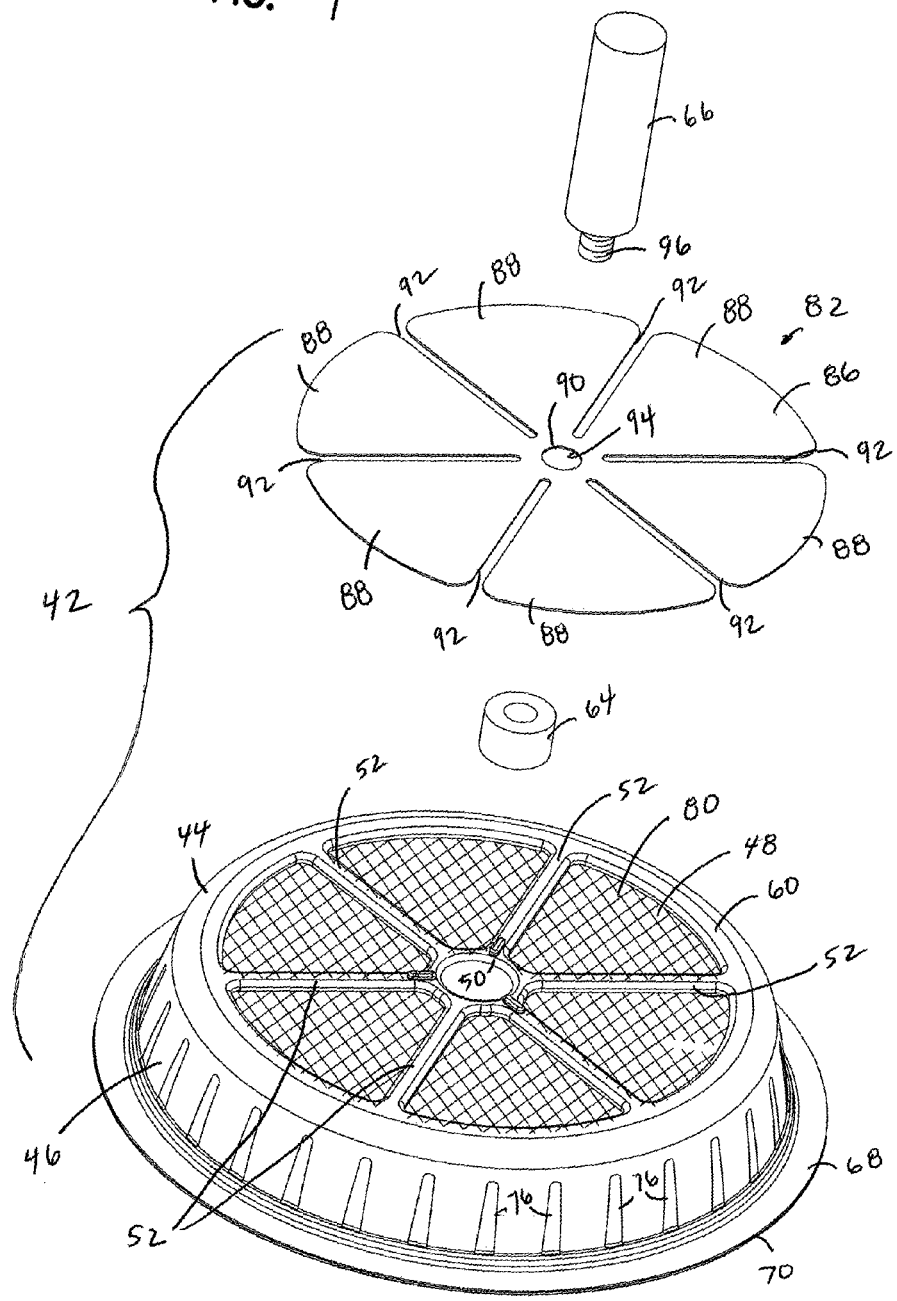
FIG. 9 is an exploded, perspective view of one embodiment of a press head assembly visible with the arrangements of FIGS. 1-6.
Figure 10:
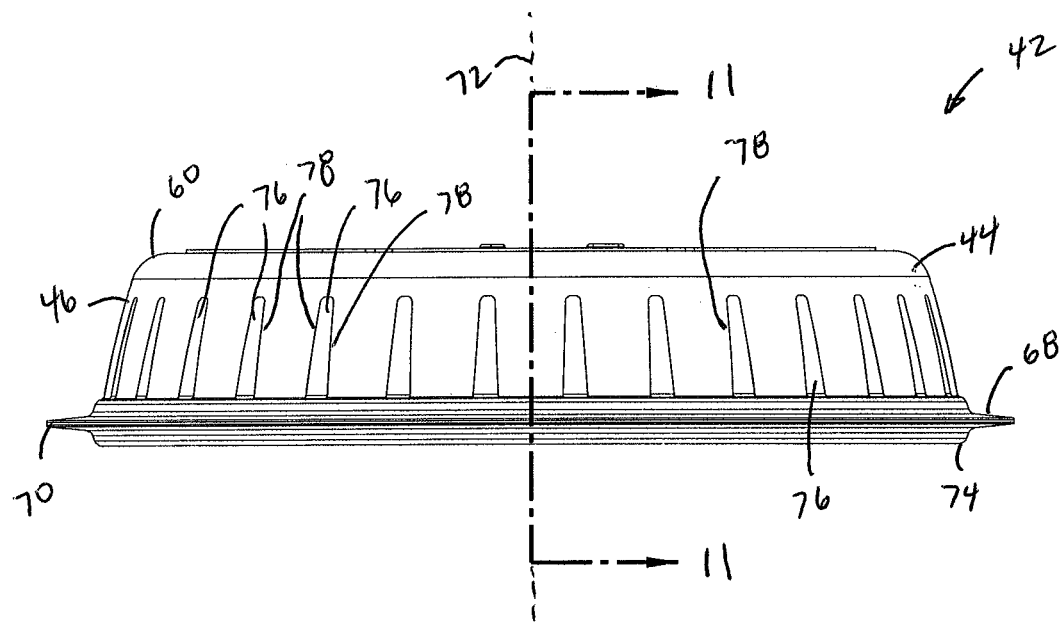
FIG. 10 is a front view of the press head assembly of FIG. 9, in an assembled position, but without the valve arrangement in place.

In reference now to FIG. 9, the frame 44, in this embodiment, includes a central hub 50 and a plurality of spokes 52 extending between the hub 50 and the perimeter edge 46. The spokes 52 are evenly spaced, and in the embodiments shown, include six evenly spaced spokes 52. The open volume 48 is defined between the adjacent spokes 52.

Figure 11:
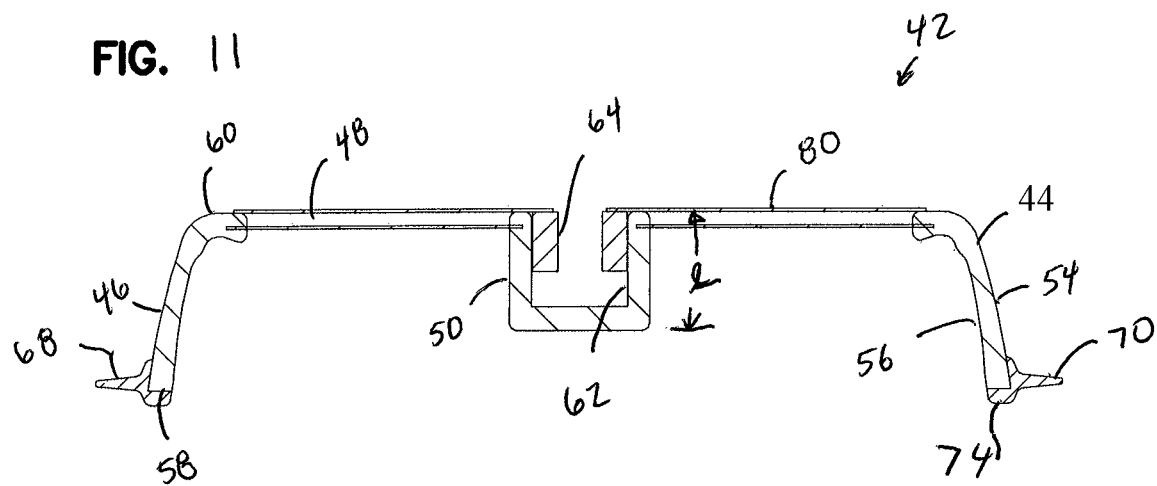
FIG. 11 is a cross-sectional view of the press head assembly of FIG. 10, the cross-section being taken along the line 11-11 of FIG. 10.

While many embodiments are possible, in this example and in reference to FIG. 11, the frame 44 can include a side wall 54 enclosing an interior volume 56 of the frame 44. The side wall 54 has an end rim 58. At the end of the side wall 54 opposite of the end rim 58 is a base 60. The spokes 52 extend from the base 60 to the hub 50. The hub 50 extends from the spokes 52 from a level of the base 60 in a direction toward the rim 58. In this embodiment, the length of the hub 50, shown at L in FIG. 11, does not extend axially past the rim 58 (see FIG. 11).

While many different embodiments are possible, in this arrangement, the frame 44 is made from plastic, such as polypropylene or similar materials.

The hub 50 of the frame 44 defines a frame aperture 62. In reference to FIGS. 9 and 11, the frame aperture 62 can include a threaded insert 64. The threaded insert 64 can be made of stainless steel, for example, and include machined threads for threadably engaging complementary threads. For example, as will be described further below, the threaded insert 64 can threadably engage a rod 66.

In preferred embodiments, the press head assembly 42 includes a seal member 68. The seal member 68 can be located along the perimeter edge 46 of the frame 44 and be sized to engage against or wipe the interior surface 40 of the surrounding wall 32 along at least a portion of the interior surface 40. In some examples, the seal member 68 is sized to engage against or wipe the interior surface 40 of the surrounding wall 32 along the entire length of the beverage containing section of the vessel 28. In the example of FIG. 1, the seal member 68 forms a tighter seal with the vessel 28 as the seal member 68 is moved closer to the bottom end 30, due to the decreasing size of the cross-sectional inner diameter of the vessel 28.

The seal member 68 can be made from many different types of a rubber-like material, including, for example, silicone or polyurethane. In the embodiment of FIGS. 9-12, the seal member 68 is secured to the frame 44 by overmolding.

The seal member 68 typically will include a flange 70 extending from the perimeter edge 46. In the examples shown, the flange 70 extends in a direction generally perpendicular to a central axis 72 (FIG. 10) extending through the frame 44.

Figure 7:
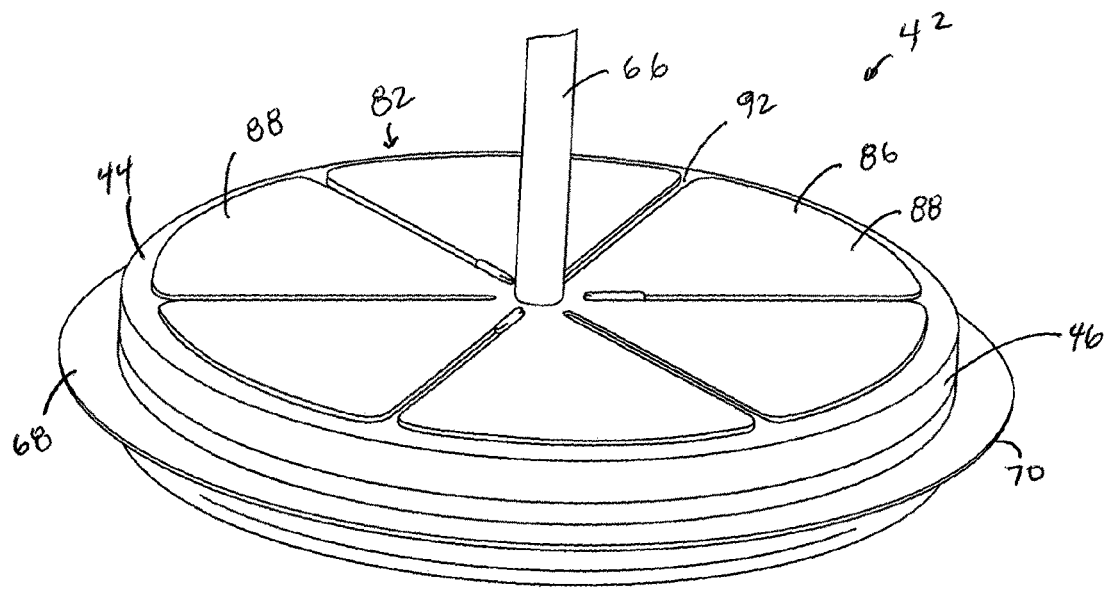
FIG. 7 is an enlarged, perspective view of the press head assembly, used in the embodiments of FIGS. 1-6.
Figure 8:
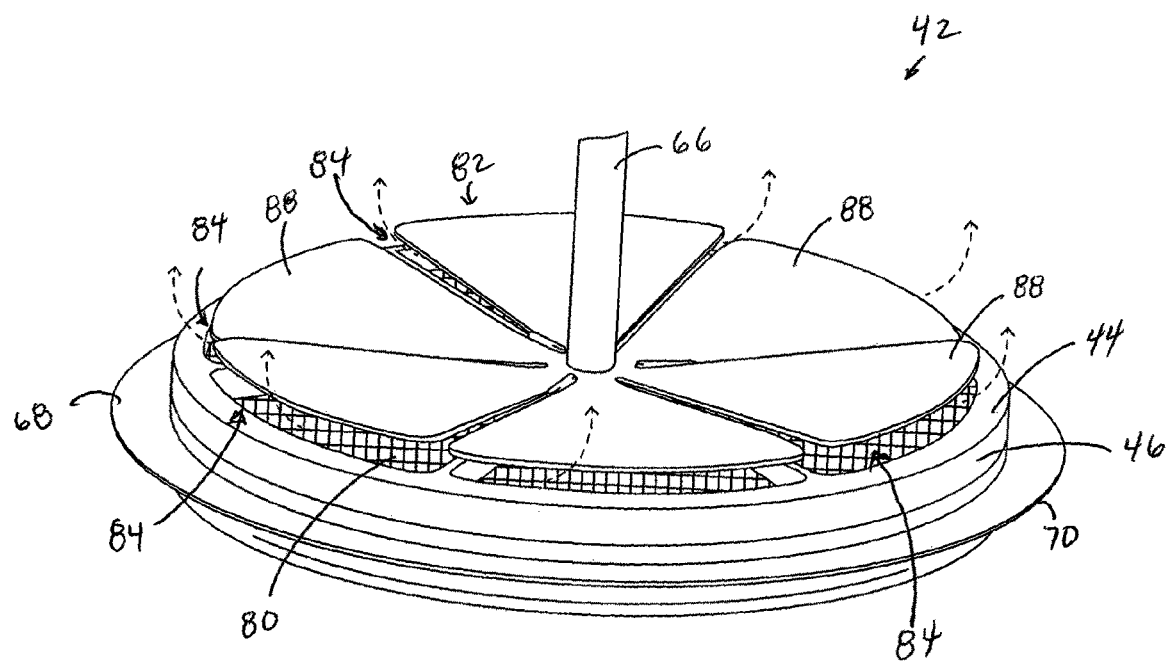
FIG. 8 is an enlarged, perspective view of the press head assembly of FIG. 7 and showing the valve arrangement in an open state.

In the embodiment of FIGS. 7 and 8, the seal member 68 can include a form of an O-ring that is press fit onto the frame 44. In the embodiment of FIGS. 9-12, as mentioned previously, the seal member 68 is overmolded onto the frame 44. In FIG. 11, the seal member 68 can be seen with a lip 74 covering the rim 58 of the frame 44. In the example embodiment shown, the seal member 68 also includes projections 76 (FIG. 10) extending from the flange 70 and being received within open slots 78 (FIG. 10) in the frame 44 to help secure the frame 44 and seal member 68 together during the overmolding process. Many embodiments are possible for attaching the seal member 68 to the frame 44.

The press head assembly 42 further includes a filter in the form of a screen 80. The screen 80 covers the open volume 48 of the frame 44. The screen 80 is used to trap particulate, such as coffee grounds and separate the particulate from the liquid.

The screen 80 can have a variety of sizes, sized appropriate for whatever application it is being used for. For example, if the screen 80 is used for making French press coffee, the mesh size of the screen will be at least 0.01", and no greater than 0.040", typically 0.016"-0.36".

In reference again to FIG. 9, the screen 80 will cover the open volume 48 and will be between adjacent spokes 52. Typically, there will be one single screen 80 that is secured to the frame 44 by a process such as overmolding. The screen 80 will typically be made from a stainless steel.

In accordance with principles of this disclosure, the press head assembly 42 includes a valve arrangement 82. The valve arrangement 82 will prevent the liquid from being exposed too long to the particulate matter that is trapped between the screen 80 and the bottom end 30 of the vessel 28. For example, if coffee is being made in the vessel 28, the valve arrangement 82 prevents the coffee from over steeping once the press head assembly 42 is pressed down against the bottom end 30. The valve arrangement 82 prevents the coffee from becoming bitter, by the water being overexposed to the coffee grounds.

The valve arrangement 82 covers the screen 80 and provides a barrier between the interior volume 56 of the frame 44 and a remaining interior volume 38 of the vessel 28. The valve arrangement 82 is movable in response to fluid pressure to create a gap 84 (FIG. 8) between the valve arrangement 82 and the frame 44 in order to permit fluid to pass through the screen 80 and the gap 84. In this manner, the valve arrangement 82 does not prevent liquid, such as water, from escaping as the press head assembly 42 is pressed or moved from adjacent the mouth 34 toward the closed bottom end 30.

While many embodiments of the valve arrangement 82 are possible, in the embodiment shown, the valve arrangement 82 comprises a flap valve 86. The flap valve 86 is a valve that has at least one flap that is movable in response to fluid pressure.

In the embodiment shown, the flap valve 86 includes a plurality of movable flap valve members or sectors 88.

In reference now to FIG. 9, in this embodiment, the flap valve 86 includes a central hub 90 and the plurality of movable sectors 88 connected to the hub 90. When assembled to a remaining portion of the press head assembly 42, each sector 88 is oriented over a portion of the screen 80, while each sector 88 is spaced from an adjacent sector by a gap 92. In this embodiment, each sector 88 is generally pie-wedge shaped.

In FIG. 12, it can be seen how, when the press head assembly 42 is assembled, the gaps 92 in the flap valve 86 are oriented along a respective one of the spokes 52.

Attention is again directed to FIG. 9. The central hub 90 of the flap valve 86 defines a valve aperture 94. When the press head assembly 42 is assembled, the frame aperture 62 and the valve aperture 94 are concentric.

In preferred embodiments, the flap valve 86 is made from stainless steel and is thin enough to deflect and move responsive to fluid pressure within the vessel 28 as the press head assembly 42 is moved from adjacent the mouth 34 to adjacent the bottom wall 30. In example embodiments, the flap valve 86 has a thickness at least 0.010" and no greater than 0.032".

As mentioned previously, in the example embodiment illustrated, the mug 20 further includes rod 66. The rod 66 is connected to the press head assembly 42 and transmits a force onto the press head assembly 42 to move the press head assembly 42 within the interior volume 38 of the vessel 28. The rod 66 can be connected to the press head assembly 42 by being received within the frame aperture 62 and valve aperture 94. It may be fastened to the press head assembly 42 by threadably connecting the rod 66 to the threaded insert 64 held within the frame aperture 62. As can be seen in FIG. 9, the rod 66 may include a threaded end 96 for this threadable engagement.

In this example embodiment, the connection between the rod 66 and the press head assembly 42 holds the flap valve 86 in place against the screen 80 of the press head assembly 42. Alternatives are possible.

In reference now to FIGS. 4-6, in preferred embodiments, the rod 66 further includes a handle 98. The handle 98 is shown in this embodiment as being at an end of the rod 66 opposite from the threaded end 96 that engages the press head assembly 42. The handle 98 can be many different embodiments, and is illustrated as a disk 99 generally perpendicular to the rod 66 and sized to be grasped by a thumb and a couple of fingers of a human hand. The handle 98 can be grasped in order to move the rod 66 and apply a force to the press head assembly 42 toward the closed bottom wall 30.

As mentioned previously, in many preferred embodiments, the mug 20 includes lid 36. The lid 36 is sized to be removable from the vessel 28 and selectively close the vessel 28 by covering the mouth 34. The lid 36 can also include a slot for allowing a person to consume the beverage through the lid 36 directly from the vessel 28.

In this embodiment, the lid 36 defines a central bowl or recess 102. The recess 102 has a base 104 and an extending sidewall 106 extending from the base 104. The recess 102 is sized to hold the handle 98 therein, when the press head assembly 42 is at or adjacent the bottom end 30 of the vessel 28. See, for example, FIG. 1, which shows the disk 99 of the handle 98 circumscribed by the sidewall 106 of the recess 102.

A method of making a beverage can be practiced by following the principles above. For example, in the method, a mixture of solid particles or particulate 110 and liquid 112 is provided into the vessel 28. For example, coffee grounds can be put in the vessel 28, followed by hot water. This mixture of the solid particles 110 and the liquid 112 are allowed to steep so that the particles 110 are infused into the liquid.

Next, there is a step of moving the press head assembly 42 within the vessel 28 toward the bottom end 30 of the vessel 28 to trap the solid particles or particulate 110 between the screen 80 and the press head assembly 42 and the bottom end 30, while allowing the liquid 112 to flow through the gap 84 between the flap valve 86 and the frame 44 of the press head assembly 42.

FIG. 4 shows the vessel 28 after the particulate 110 and liquid 112 have been added. The press head assembly 42 is shown located adjacent to the open mouth 34 and above the level of the liquid 112 and particulate 110 mixture. The flap valve 86 is shown as being closed with no gap 84 exposed, while the beverage steeps. The rod 66 is extending through the lid 36, and the handle 98 is axially spaced from/away from the lid 36 and the vessel 28.

FIG. 5 shows the step of the method of moving the press head assembly 42 in a direction from the FIG. 4 position and toward the bottom end 30. The fluid pressure causes the flap valve 86 to open, such that the sectors 88 are moved away from the frame 44 to form gaps 84. The gaps 84 allow the liquid 112 to flow through the screen 80 and through the gap 84 to a filtered region 114 of the interior volume 38 between the flap valve 86 and the open mouth 34. The particulate matter 110 (e.g., coffee grains) are trapped in the interior volume 38 in an unfiltered region 116 between the press head assembly 42 and the closed bottom end 30. The seal member 68 seals against most coffee grounds (or particulate 110) from reaching the filtered region 114 (e.g., the other side) of the press head assembly 42. The seal member 68 engages against, or wipes, the interior surface 40 of the vessel 28. The screen 80 prevents most of the particulate 110 from passing therethrough.

FIG. 6 shows the press head assembly 42 moved from the position in FIG. 5 toward the bottom end 30, with the press head assembly 42 pressed against the particulate 110, so that the particulate 110 is trapped between the press head assembly 42 and the bottom end 30. The valve 86 is closed and prevents the beverage in the interior volume 38 between the press head assembly 42 and the open mouth 34 (i.e., the filtered region 114) from continuing to be exposed to the particulate 110 trapped between the press head assembly 42 and the bottom end 30. This prevents oversteeping and bitterness, when the beverage being made is coffee. The handle 98 is shown resting in the recess 102 of the lid 36.

After the beverage is consume from the vessel 28, the press head assembly 42 can be removed for cleaning of both the press head assembly 42 and the vessel 28.

The above represents example principles. Many embodiments can be made according to these principles.

What is claimed is:

1. A method of making a beverage, the method comprising:
   (a) providing a mixture of solid particles and a liquid into a vessel;
   (b) moving a press head assembly within the vessel toward a bottom of the vessel to trap the solid particles between a screen in the press head assembly and the bottom, while allowing the liquid to flow through an opening between a flap valve and a frame of the press head assembly; and
   wherein the step of moving the press head assembly includes the flap valve of the press head assembly having a central hub and a plurality of movable pie wedge shaped sectors connected to the hub, each pie wedge shaped sector oriented over a portion of the screen; each pie wedge shaped sector being spaced from an adjacent sector by a gap wherein the opening is formed by upward deflection of the pie wedge shaped sectors in response to fluid pressure within the vessel as the press head assembly is moved;

wherein each gap is between adjacent sectors and extends from the hub to an outer perimeter of the flap valve to separate each sector at the outer perimeter of the flap valve.

2. The method of claim 1 wherein the step of providing a mixture of solid particles and a liquid into a vessel includes the vessel having a surrounding wall, an open mouth opposite of the bottom, and an interior volume defined by the surrounding wall and the bottom; the surrounding wall including an interior surface surrounding the interior volume.

3. The method of claim 2 wherein the step of moving a press head assembly includes the press head assembly frame having a perimeter edge and an open volume within the perimeter edge; the press head assembly having a seal member along the perimeter edge of the frame and sized to wipe the interior surface of the surrounding wall along at least a portion of the interior surface; and wherein the screen covers the open volume of the frame.

4. The method of claim 3 wherein the step of moving the press head assembly includes the flap valve covering the screen and being movable in response to fluid pressure.

5. The method of claim 1 further including using a rod connected to the press head assembly to transmit a force onto the press head assembly to move the press head assembly within the vessel.

6. The method of claim 5 further including removably covering the vessel with a lid, wherein the rod slidably extends through the lid.

7. The method of claim 6 wherein the step of removably covering the vessel with a lid includes the lid having a recess; the rod having a handle; and the handle being received within the recess, when the press head assembly is moved toward the bottom of the vessel.

8. The method of claim 3 wherein the step of moving a press head assembly includes the seal member of the press head assembly including a flange extending from the perimeter edge.

9. The method of claim 8 wherein the step of moving a press head assembly includes the seal member of the press head assembly being overmolded onto the frame; and the screen being secured to the frame by overmolding.

10. The method of claim 1 wherein the step of providing a mixture of solid particles and a liquid into a vessel includes the vessel having a surrounding wall that is a double wall of stainless steel.

11. The method of claim 1 wherein the step of moving a press head assembly includes the press head assembly frame having a perimeter edge that has a circular cross-sectional shape.

12. The method of claim 1 wherein the step of moving a press head assembly includes the press head assembly having a plurality of spokes extending between the hub and a perimeter edge.

13. A method of making a beverage, the method comprising:
(a) providing a liquid into a vessel; the vessel having a bottom end, a surrounding wall, an open mouth opposite of the bottom end, and an interior volume defined by the surrounding wall and bottom end; and
(b) moving a press head assembly within the interior volume of the vessel between the mouth and the bottom end; the press head assembly including,
  (i) a frame having a perimeter edge and an open volume within the perimeter edge;
  (ii) a seal member along the perimeter edge;
  (iii) a screen covering the open volume of the frame; and
  (iv) a flap valve having a central hub and a plurality of movable sectors covering the screen, each sector being connected to the central hub and spaced from an adjacent sector by a gap; and each sector being movable in response to fluid pressure to create an opening between at least one of the valve sectors and the frame and permit the liquid to pass through the screen and the opening;
  wherein each gap is between adjacent sectors and extends from the hub to an outer perimeter of the flap valve to separate each sector at the outer perimeter of the flap valve.

14. The method of claim 13 further comprising:
(a) using a rod connected to the press head assembly to transmit force onto the press head assembly to move the press head assembly within the interior volume of the vessel; wherein the flap valve is secured to the frame by the rod.

* * * * *